Patented Aug. 11, 1953

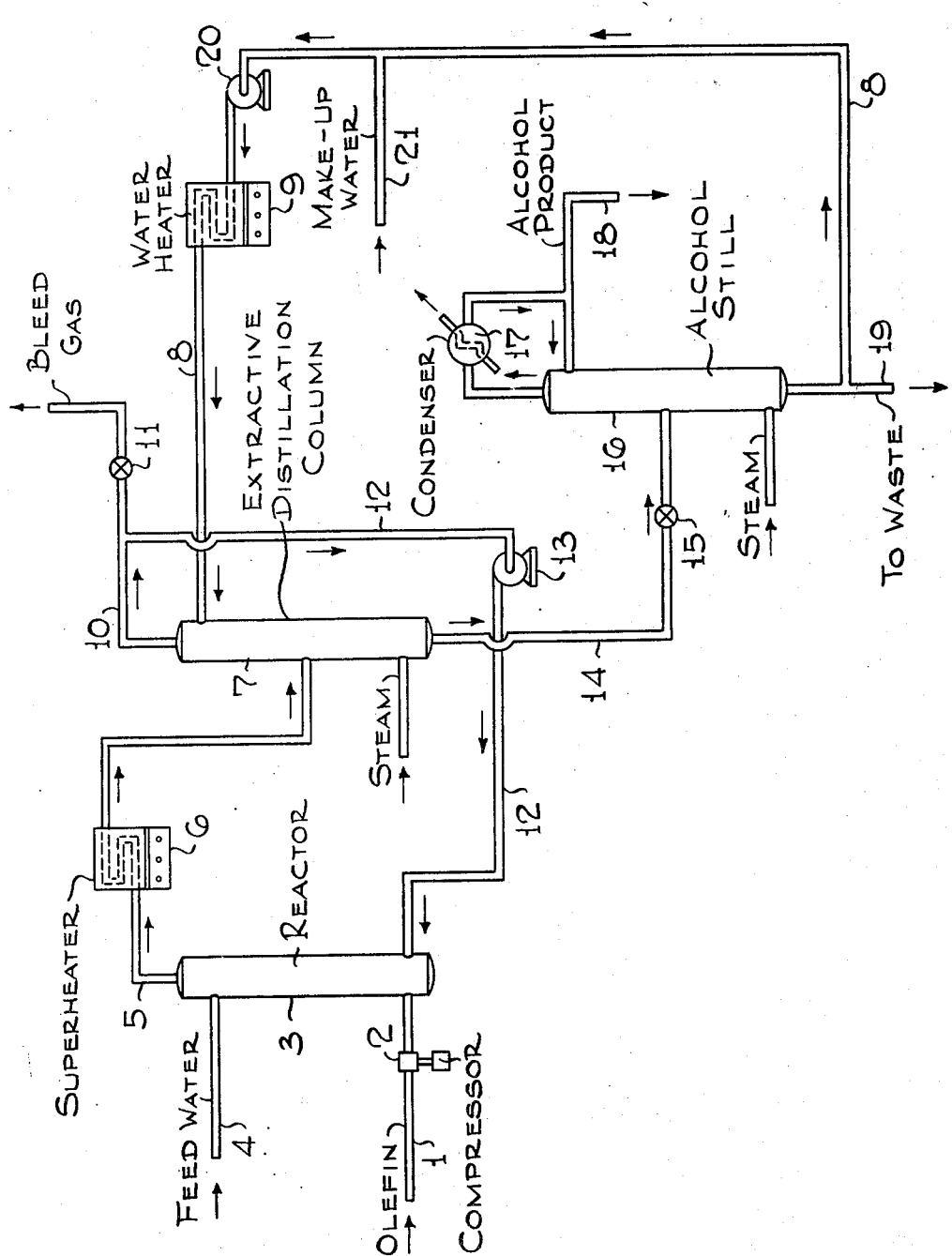

2,648,711

UNITED STATES PATENT OFFICE 2,648,711

RECOVERY OF ALCOHOLS FROM DIRECT HYDRATION OF OLEFINS

E. Wendell Carrier, Cranford, N. J., assignor to Standard Oil Development Company, a corporation of Delaware Application July 19, 1949, Serial No. 105,566

8 Claims. (Cl. 260—641)

This invention relates to an improved process for the recovery of alcohol obtained by the direct hydration of olefins. The invention is specifically concerned with the recovery of alcohol substantially free of ether and dissolved hydrocarbons in a single operation from the olefin hydration products. More particularly the invention is concerned with the recovery of alcohol free of ether from olefin hydration products by submitting the vaporous product under the conversion conditions of temperature and pressure to an extractive distillation operation in which the ether is removed overhead together with all unreacted hydrocarbons and in which the alcohol substantially free of ether is recovered as an aqueous solution as bottoms from the extractive distillation zone.

In the direct synthesis of ethanol from ethylene and water at high temperatures and pressures, employing aqueous acid catalysts either as liquids or as liquids supported on an inert carrier or employing solid catalysts as such, wherein the ethanol formed is obtained as a complex vapor mixture with the unreacted portions of the feed gases containing also inert hydrocarbon diluents and appreciable quantities of diethyl ether, which is an undesirable by-product, a very important problem in the development of an economic process is efficient recovery of the ethanol from the vapor mixture discharged by the reactor. The recovery step is important due to the necessity to recycle continuously large amounts of unreacted ethylene, and usually diethyl ether, to the reactor in order to obtain practical utilization of the raw material, as well as due to the fact that the ethanol must finally be produced in commercially pure form to be sold favorably.

All known processes prior to U. S. 2,142,036 teach that regardless of the manner in which the hydration reaction is conducted, or the means used to recover the heat in the vapors from the reaction zone, the only way in which the products of reaction may be recovered is to cool the vapor mixture to a relatively low temperature where condensation of a substantial part of the alcohol and ether products takes place, together with condensation of most of the residual water vapor accompanying the reaction products. U. S. 2,142,036 teaches that alcohols may be recovered from the complex vapor mixture from the reaction zone by scrubbing with water under substantially the same high pressure and temperature conditions prevailing in the reactor. The scrubbing water is preheated and regulated to such temperature that the washed gases are saturated with steam in the desired ratio to olefin for recycling to the reaction zone. In this manner the unreacted gases are purified of the products of reaction without appreciable cooling and without condensation of the residual water vapor. The dilute aqueous alcohol solution from the scrubber (or absorber) is continuously distilled in order to remove the alcohol from the major portion of the water at substantially the temperature of the scrubbing system, so that the alcohol-free water can be recycled to the scrubber with negligible heat loss. However, no mention is made in U. S. 2,142,036 of the presence of undesirable quantities of ether generally accompanying the alcohol formed by the hydration of olefins under practically all reaction conditions. Neither is mention made in U. S. 2,142,036 that the water containing the recovered alcohol at the bottom of the scrubber will also contain some dissolved unreacted olefin and other low boiling hydrocarbons accompanying the original olefin feed to the reaction zone.

The process of this invention represents an improvement of the process of U. S. 2,142,036. According to this invention it is proposed to recover alcohol free of ether and hydrocarbons from the vaporous products of the direct hydration reaction by submitting the vaporous product at substantially the high temperature and pressure conditions of the hydration reaction to a water extractive distillation operation. In this manner practically all the ether is removed from the hydration product as an overhead vapor stream together with all unreacted hydrocarbons. The ether and unreacted hydrocarbons are saturated with steam and are returned to the hydration reactor. The water entering at the top of the extractive distillation column is preheated and regulated to the proper temperature to saturate the ether and hydrocarbons recycled to the reactor with steam in just the desired ratio. Usually the desired quantity of steam to be recycled to the reactor is the same as that in the vaporous product from the reactor. Dilute aqueous alcohol practically free of ether and hydrocarbons is obtained as bottoms from the extractive distillation zone. The bottoms are continuously distilled without appreciable reduction of temperature to recover the dissolved alcohol from the major portion of the water and the water is returned without major heat loss but with temperature adjustment to the top of the water extractive distillation zone. The water extractive distillation column may be operated with or without external reflux. External reflux is usually not required but may be obtained by adding small quantities of ether to the water returned to the top of the extractive distillation column.

The process of this invention has the advantage that extra fractionation equipment and energy are not expended further on in the alcohol plant to remove ether and hydrocarbons to the high degree necessary to manufacture commercially pure alcohol, particularly ethanol and isopropanol. Furthermore, since it is usually desirable to recycle the recovered ether to the reaction zone in order to suppress its formation, essentially all of the ether in the reactor vapors are left in the effluent gases from the water extractive distillation zone for direct recycling along with unreacted olefins saturated with stream in the desired ratio.

The conditions employed in the direct hydration reaction are those conditions which are well known in the art. Temperatures in the vicinity of 150–375° C., preferably 200–250° C., and pressures from atmospheric pressure up to 3000 p. s. i. g. or higher are employed. Within the preferred temperature range a pressure of 500–1000 p. s. i. g. is the preferred pressure. The catalyst employed in the reaction is an acid-type catalyst. It may be an aqueous catalyst such as aqueous sulfuric acid or phosphoric acid, preferably dilute sulfuric acid or phosphoric acid, or the catalyst may be in solid form, for example, phosphoric acid on a suitable carrier such as alumina. The solid catalyst may be employed with the various promoters well known in the art. If an aqueous catalyst is used, it is usually advantageous to recycle enough steam together with the fresh feed water added to the reactor to just saturate the vaporous product from the reactor at the temperature and pressure maintained for hydration. In this manner the catalyst concentration is kept constant.

The attached drawing illustrates in diagrammatical view one arrangement of apparatus for carrying out the present invention.

Referring to the drawing, an olefin-containing gas is admitted to the system through line 1. After compression it is admixed with recycle gas from the extractive distillation column 7 in the hydration reaction zone 3. Feed water is pumped into reactor 3 through line 4 in an amount usually sufficient to furnish the steam used up by the hydration reaction but insufficient to saturate the effluent vapors from the reactor. The temperature of the feed water is adjusted before admission to the reaction zone in order to control the temperature of the catalyst therein. Heat is evolved by the olefin hydration reaction which is absorbed by vaporization of the feed water and by its change in sensible heat content in the reactor. In the reaction zone the olefin and steam react in the presence of the catalyst within the temperature and pressure ranges previously mentioned to form alcohol and, in addition, more or less considerable quantities of ether. The alcohol, ether, steam, unconverted olefin and other hydrocarbon gases leave the reaction zone in the vapor phase via line 5. The total reactor effluent without condensation is introduced at an intermediate point into the extractive distillation zone 7, where the temperature and pressure is substantially the same as in the reaction zone, that is, at temperatures between 150 and 375° C., and at pressures from 500 to 3000 p. s. i. g. However, it is usually necessary to add small quantities of heat to the reactor vapors, as in superheater 6, before they enter the extractive distillation zone 7. Unless the temperature of the reactor vapors is increased slightly (or alternatively their pressure decreased), it is generally impracticable to obtain the desired conditions in the stripping section of the extractive distillation zone, i. e., below the feed point. Under some conditions which can be selected for the reaction zone, it is feasible to operate the intermediate feed point of the extractive distillation column at almost exactly the same temperature and pressure as in the reactor.

Water is fed to the extractive distillation zone 7 in considerable quantities via line 8. The water is fed to the top or near the top of the column, but always above its intermediate feed point. To obtain the desired separation of ether and hydrocarbons from the alcohol, the mixture is subjected to continuous fractional distillation in zone 7. The water introduced in sufficiently large quantities at the upper part of zone 7 effectively enhances the relative volatilities of the ether and hydrocarbons with respect to alcohol and water so that essentially none of the ether and hydrocarbons is left in the dilute alcohol solution at the bottom of the stripping section of zone 7. For continuous efficient operation, water must be added continuously near the top of the column while the complex crude alcohol vapor mixture is continuously fed into the column at a lower point and while sufficient heat, usually in the form of direct steam, is provided to effect distillation throughout the column. A large proportion of the vapors of the crude alcohol components introduced as feed stream pass upwardly through the absorbing section of the extractive distillation zone, i. e., above the feed point, in contact with the descending internal aqueous liquid reflux under equilibrium boiling and refluxing conditions. In the stripping section of zone 7 the quantity of vapor flowing upward is usually much less than in the absorbing section due to the vapor feed, but these stripped vapors are likewise in contact with descending internal aqueous liquid reflux under equilibrium boiling conditions. Due to the fact that water very much in excess of the amount of water distilled overhead with the ether and hydrocarbons entering with the feed vapors, together with a small amount of alcohol which is also distilled, is introduced near the top of the absorbing section, the water concentration in the descending liquid throughout the column is considerably higher than the water concentration in the vapors in contact with the liquid in any part of zone 7. As previously mentioned, the temperature of the water continuously fed near the top of the absorbing section is regulated externally, as in heater 9, so that the distilled vapors of ether, unreacted olefin, other low-boiling hydrocarbon impurities in the olefin feed to the reactor and a little alcohol vapor are saturated with steam in just the right ratio for recycling to the reaction zone via line 12.

The complex vapor mixture just described which is distilled from the top of the distillation zone 7 leaves the column via line 10, whence it is split into two streams. A very small sidestream is withdrawn through pressure reducing valve 11 in order to purge the low-boiling hydrocarbons, such as methane and ethane, which entered the system with the fresh olefin feed to the reactor. Unless the small sidestream purge is taken, the low-boiling hydrocarbon impurities will accumulate to be an undesirably high proportion of the recycle stream. It may be advisable to recover small quantities of alcohol and water, together with some ether contained in the purge stream, by partially condensing the bleed gas in a condenser (not shown on the drawing) under reduced temperature conditions. The condensate so obtained may be pumped back into the absorbing section of the extractive distillation zone 7, or it may be mixed with the relatively large quantity of water entering the column in line 8. By far the larger part of the vapor mixture leaving the top of the extractive distillation column in line 10 is recycled through line 12 by means of gas pressure booster 13 back to the hydration reaction zone 3. It is the purpose of this recycle operation to increase the conversion of olefin feed in the system so that only a small quantity of olefin will be present in the bleed gas released through valve 11. Also by recycling in this manner essentially all of the ether appearing in the vaporous product from the reactor, the olefin converted in reaction zone 3 is hydrated almost entirely to the desired product which is alcohol.

The quantity of water required continuously at the top of the extractive distillation zone 7 must usually be enough to absorb, while descending through the column, in excess of 80% of the alcohol present in the vaporous product from the reactor. The quantity of water required for this purpose will, of course, depend on the concentration of alcohol in the vapor from the reactor. However, if sufficient water is fed to the extractive distillation column to enhance the volatilities of ether and hydrocarbons relative to alcohol and water to the degree necessary to eliminate practically all ether and hydrocarbons from the dilute aqueous alcohol bottoms leaving the stripping section of 7 by line 14, generally no more than 10% of the alcohol available in the reactor vapors is left unabsorbed to be recycled through line 12. The quantity of water required to improve the relative volatilities to the extent desired for complete vaporization of ether and dissolved hydrocarbons is such that the concentration of the homogeneous internal reflux is substantially above a critical minimum in the range of 65–99.9 mol percent water, preferably 95–99 mol percent water.

On the other hand, if no more effective equipment than a scrubber is employed to remove the alcohol from the reactor vapors, as suggested in U. S. 2,142,036, when enough water is fed to absorb in excess of 80% of the alcohol present, the scrubber bottoms will be found to contain between 0.01 and 0.1 mol of ether per mol of alcohol absorbed, depending on the alcohol-ether ratio in the hydration product and the operating conditions of the scrubber. The scrubber bottoms will also contain small quantities of dissolved hydrocarbons. Inasmuch as alcohol products must be essentially ether- and hydrocarbon-free for the majority of commercial uses, additional fractionation and stabilizing operations would be required to produce satisfactory alcohol either before or after the dilute alcohol is concentrated by rectification.

Returning to the attached drawing, hot, dilute aqueous alcohol of high purity containing only 0.001 mol or less of ether per mol of alcohol is removed under pressure from the bottom of the extractive distillation zone 7 via line 14. Before entering the alcohol concentrating zone 16, it is desirable to lower the pressure by means of reducing valve 15. The pressure may be reduced to any value corresponding to the distillation temperatures selected for fractionation of the alcohol in column 16. The temperatures employed in the alcohol still depend upon an economic balance between the cost of the equipment, which is the function of the number of plates (or packed height) and the diameter of the tower, and the cost of steam used for distillation vs. the cost of fuel or steam required in water heater 9. In still 16 a large part of the water is removed, and the concentrated alcohol vapors pass overhead to condenser 17 from which liquid reflux is removed for return to the still, and from which the purified alcohol product is withdrawn. If still 16 is heated by direct steam, as shown, the water removed from the alcohol will pass out from the bottom of the still in admixture with condensed steam. Excess steam condensate may be removed from the system through line 19, together with any traces of non-volatile impurities such as entrained catalyst from the reaction zone. The rest of the water passes by means of pump 20 back through heater 9 in line 8, where the temperature is again raised to a predetermined point for introduction into the top of the extractive distillation zone 7. Make-up water (via line 21) may be added in line 8 ahead of pump 20 if required.

The extractive distillation column 7 may be a packed tower, a bubble-plate column, or other known type of device for obtaining intimate contact between liquid and vapor.

It is to be understood that the process of this invention is restricted to the production of those aliphatic alcohols which are stable, and at least partially miscible with water at the high temperatures and pressures employed. The invention is particularly applicable to the purification of ethanol resulting from the direct hydration of ethylene, and to the purification of isopropanol produced in a similar manner from propylene.

It is obvious that the operating conditions of the extractive distillation zone will vary with the alcohol being produced in the reaction zone. However, the extractive distillation is carried out under temperature and pressure conditions substantially similar to those prevailing in the hydration reaction zone. The amount of water added to the distillation column will vary with the nature of the alcohol being produced. Although the invention has been described employing water in the distillation process, it is permissible to use water containing small amounts of salts such as sodium acetate, or acids such as sulfuric acid, or even alkalis such as sodium hydroxide.

What is claimed is:

1. A process for the production of an ether-free saturated monohydric alcohol by the direct hydration of an olefin which comprises reacting the olefin with water vapor in a reaction zone at a temperature of 150° C. to 375° C. and at a pressure in the range of 500 p. s. i. g. to 3000 p. s. i. g in the presence of an acid catalyst, removing from the reaction zone a gaseous product comprising alcohol, ether and unreacted olefins, passing the gaseous product without reduction in temperature and pressure to an intermediate point of an extractive distillation zone, introducing sufficient water to the extractive distillation zone at a point substantially above the gaseous product feed point to maintain an internal liquid reflux having a water content of 65—99.9 mol per cent below the point of addition of the water, distilling from the gaseous product under substantially the same temperature and pressure conditions of the hydration reaction a vaporous mixture comprising ether, alcohol and unreacted olefins which flows countercurrent to the descending aqueous reflux, and withdrawing an aqueous solution of alcohol substantially free of ether from a lower portion of the extractive distillation zone.

2. A process for the production of an ether-free saturated monohydric alcohol by the direct hydration of an olefin which comprises reacting the olefin with water vapor in a reaction zone at a temperature of 150° C. to 375° C. and at a pressure in the range of 500 p. s. i. g. to 3000 p. s. i. g. in the presence of an acid catalyst, removing from the reaction zone a gaseous product comprising alcohol, ether and unreacted olefins, passing the gaseous product without reduction in temperature and pressure to an intermediate point of an extractive distillation zone, introducing sufficient water to the extractive distillation zone at a point substantially above the gaseous product feed point to maintain an internal liquid reflux having a water content of 65–99.9 mol per cent below the point of addition of the water, distilling from the gaseous product under substantially the same temperature and pressure conditions of the hydration reaction a vaporous mixture comprising ether, alcohol and unreacted olefins which flows countercurrent to the descending aqueous reflux, withdrawing an aqueous solution of alcohol substantially free of ether from a lower portion of the extractive distillation zone, removing a gaseous stream comprising ether, unreacted olefin and water vapor overhead from the extractive distillation zone and returning the gaseous stream to the reaction zone.

3. A process for the production of diethyl ether-free ethanol by the direct hydration of ethylene which comprises reacting ethylene with water vapor in a reaction zone at a temperature of 150° C. to 375° C. and at a pressure in the range of 500 p. s. i. g. to 3000 p. s. i. g. in the presence of an acid catalyst, removing from the reaction zone a gaseous product comprising ethanol, diethyl ether and unreacted ethylene, passing the gaseous product without reduction in temperature and pressure to an intermediate point of an extractive distillation zone, introducing sufficient water to the extractive distillation zone at a point substantially above the gaseous product feed point to maintain an internal liquid reflux having a water content of 65–99 mol per cent below the point of addition of the water, distilling from the gaseous product under substantially the same temperature and pressure conditions of the hydration reaction a vaporous mixture comprising diethyl ether, ethanol and unreacted ethylene which flows countercurrent to the descending aqueous reflux, and withdrawing an aqueous solution of ethanol substantially free of diethyl ether from a lower portion of the extractive distillation zone.

4. A process for the production of diethyl ether-free ethanol by the direct hydration of ethylene which comprises reacting ethylene with water vapor in a reaction zone at a temperature of 200° C. to 250° C. and at a pressure of 500 to 1000 p. s. i. g. in the presence of an acid catalyst, removing from the reaction zone a gaseous product comprising ethanol, diethyl ether and unreacted ethylene, passing the gaseous product without reduction in temperature and pressure to an intermediate point of an extractive distillation zone, introducing sufficient water to the extractive distillation zone at a point substantially above the gaseous product feed point to maintain an internal liquid reflux having a water content of 65–99 mol per cent below the point of addition of the water, distilling from the gaseous product under substantially the same temperature and pressure conditions of the hydration reaction a vaporous mixture comprising diethyl ether, ethanol and unreacted ethylene which flows countercurrent to the descending aqueous reflux, withdrawing an aqueous solution of ethanol substantially free of diethyl ether from a lower portion of the extractive distillation zone, removing a gaseous stream comprising diethyl ether, unreacted ethylene and water vapor overhead from the extractive distillation zone and returning the gaseous stream to the reaction zone.

5. A process according to claim 4 in which the water content of the internal liquid reflux is 95–99 mol per cent.

6. A process for the production of isopropyl ether-free isopropanol by the direct hydration of propylene which comprises reacting propylene with water vapor in a reaction zone at a temperature of 200° C. to 250° C. and at a pressure of 500 to 1000 p. s. i. g. in the presence of an acid catalyst, removing from the reaction zone a gaseous product comprising isopropanol, isopropyl ether and unreacted propylene, passing the gaseous product without reduction in temperature and pressure to an intermediate point of an extractive distillation zone, introducing sufficient water to the extractive distillation zone at a point substantially above the gaseous product feed point to maintain an internal liquid reflux having a water content of 70–99 mol per cent below the point of addition of the water, distilling from the gaseous product under substantially the same temperature and pressure conditions of the hydration reaction a vaporous mixture comprising isopropyl ether, isopropanol and unreacted propylene which flows countercurrent to the descending aqueous reflux, and withdrawing an aqueous solution of isopropanol substantially free of isopropyl ether from a lower portion of the extractive distillation zone.

7. A process for the production of isopropyl ether-free isopropanol by the direct hydration of propylene which comprises reacting propylene with water vapor in a reaction zone at a temperature of 200° C. to 250° C. and at a pressure of 500 to 1000 p. s. i. g. in the presence of an acid catalyst, removing from the reaction zone a gaseoous product comprising isopropanol, isopropyl ether and unreacted propylene, passing the gaseous product without reduction in temperature and pressure to an intermediate point of an extractive distillation zone, introducing sufficient water to the extractive distillation zone at a point substantially above the gaseous product feed point to maintain an internal liquid reflux having a water content of 70–99 mol per cent below the point of addition of the water, distilling from the gaseous product under substantially the same temperature and pressure conditions of the hydration reaction a vaporous mixture comprising isopropyl ether, isopropanol and unreacted propylene which flows countercurrent to the descending aqueous reflux, withdrawing an aqueous solution of isopropanol substantially free of isopropyl ether from a lower portion of the extractive distillation zone, removing a gaseous stream comprising isopropyl ether, unreacted propylene and water vapor overhead from the extractive distillation zone and returning the gaseous stream to the reaction zone.

8. A process according to claim 7 in which the water content of the internal liquid reflux is 95–99 mol per cent.

E. WENDELL CARRIER.

References Cited in the file of this patent

UNITED STATES PATENTS

| Number | Name | Date |
|---|---|---|
| 2,080,111 | Bump | May 11, 1937 |
| 2,142,036 | Rowland et al. | Dec. 27, 1938 |
| 2,290,636 | Deanesly | July 21, 1942 |
| 2,313,196 | Guinot | Mar. 9, 1943 |

FOREIGN PATENTS

| Number | Country | Date |
|---|---|---|
| 527,316 | Great Britain | Oct. 7, 1940 |